(12) United States Patent
Taniguchi et al.

(10) Patent No.: US 6,514,175 B2
(45) Date of Patent: Feb. 4, 2003

(54) HYDRAULIC CONTROL SYSTEM FOR TRANSMISSIONS

(75) Inventors: Hiroji Taniguchi, Okazaki (JP); Katsumi Kono, Toyota (JP); Kenji Matsuo, Toyota (JP); Hideki Yasue, Toyota (JP); Tadashi Tamura, Aichi-ken (JP); Ryoji Habuchi, Okazaki (JP); Yuji Hattori, Bisai (JP); Hiroshi Morioka, Toyota (JP); Hiroki Kondo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/858,452

(22) Filed: May 17, 2001

(65) Prior Publication Data

US 2001/0044361 A1 Nov. 22, 2001

(30) Foreign Application Priority Data

May 19, 2000 (JP) ........................................ 2000-149086

(51) Int. Cl.[7] .............................................. F16H 61/30
(52) U.S. Cl. ........................ 477/156; 477/50; 477/138; 477/160
(58) Field of Search .............................. 477/44, 45, 46, 477/50, 115, 121, 127, 138, 156, 157, 158, 159, 160; 475/159, 161

(56) References Cited

U.S. PATENT DOCUMENTS

| | | | | |
|---|---|---|---|---|
| 5,093,789 A | * | 3/1992 | Yoshimura et al. | 477/158 |
| 5,131,294 A | * | 7/1992 | Yoshimura | 477/158 X |
| 5,667,457 A | * | 9/1997 | Kuriyama et al. | 477/156 |
| 5,737,712 A | * | 4/1998 | Han et al. | 477/158 X |
| 5,743,826 A | * | 4/1998 | Usuki et al. | 477/120 |
| 5,980,426 A | * | 11/1999 | Kamada et al. | 477/156 X |
| 6,022,293 A | * | 2/2000 | Dourra et al. | 475/127 |
| 6,055,475 A | * | 4/2000 | Moriyama | 477/97 |

FOREIGN PATENT DOCUMENTS

JP 9-217800 8/1997

\* cited by examiner

*Primary Examiner*—Richard M. Lorence
*Assistant Examiner*—Ha Ho
(74) *Attorney, Agent, or Firm*—Oblon, Spivak, McClelland, Maier & Neustadt, P.C.

(57) ABSTRACT

A hydraulic control system including: a rotating speed raising unit for raising the rotating speed of the prime mover while the transmission is not rotated by the prime mover, to increase an output volume of the hydraulic pump; at oil pressure instructor for outputting a plurality of instruction signals of different pressure instruction values to the valve modulating mechanism while the output volume of the hydraulic pump is increased; an oil pressure detector for detecting the oil pressure to be modulated and fed to the transmission, at a plurality of pressure levels; and a learning corrector for learning and correcting the instruction signals on the basis of the outputted pressure instruction value and the detected oil pressure detected.

22 Claims, 5 Drawing Sheets

HYDRAULIC CONTROL SYSTEM FOR TRANSMISSIONS

BACKGROUND OF THE INVENTION

1. Field of the Invention

The present invention relates to a system for controlling an oil pressure of a transmission which is hydraulically activated to set a gear ratio properly.

2. Related Art

Oil pressures to be used in the transmission are one for activating valves and one for transmitting a torque. The latter oil pressure necessary for the torque transmission is demanded to have a considerably high level but may correspond to the torque to be transmitted. In the vehicular transmission having a hydraulically controlled transmission mounted thereon, therefore, the oil pressure to be generated is varied according to the torque so that it may not become excessively high to prevent the fuel economy from deteriorating.

For example, a continuously variable transmission is constructed to have continuously variable gear ratios such that transmission members such as belts or power rollers are continuously varied in their radial positions for frictional contacts by utilizing that the peripheral velocities of rotary members are different according to those radial positions. In the continuously variable transmission of this kind, the torque is transmitted by frictional forces so that the frictional forces may match the torque to be transmitted, by varying the oil pressure for generating the frictional forces according to the toque. More specifically, the oil pressure is controlled on the basis of engine loads, as represented by the opening of a throttle or the opening (or depression) of an accelerator (pedal).

One example will be described on a belt-type continuously variable transmission. In the transmission of this kind, the torque is transmitted through the frictional forces which are generated between driving and driven pulleys having variable groove widths and a belt made to run on the pulleys. For this torque transmission, therefore, the belt clamping force by the pulleys is controlled on the basis of a load (e.g. accelerator depression) of a prime mover such as the engine connected to an input side of the continuously variable transmission.

As the control for generating the belt clamping force with the oil pressure, there has been known the so-called "open loop control", in which a target oil pressure and clamping force are obtained by outputting an instruction signal based on the load and by activating a control device such as a solenoid valve in response to that instruction signal. One example of the open loop control is disclosed in Japanese Patent Laid-Open No. 9-217800. This hydraulic control system is constructed such that the line pressure is modulated to the oil pressure of an instruction signal for a controller. In order to prevent the individual difference of the control part such as a solenoid from influencing the oil pressure, on the other hand, a detecting oil pressure is generated in response to an indication from the controller and is detected in terms of ON of a hydraulic switch disposed in a line pressure circuit, so that the correction of a working pressure may be learned and controlled on the basis of a signal coming from the hydraulic switch. Moreover, the detecting oil pressure is preferably generated under conditions for exerting no influence upon the actions of the transmission. These conditions are exemplified by the idling time, the N-range, the normal oil temperature or the vehicle stop.

The aforementioned hydraulic control system of the prior art can be made at a reasonable cost because the oil pressure sensor is replaced by a hydraulic switch, and can prevent the durability from being lost by the high oil pressure because the detecting oil pressure is temporarily generated at the idling time in the N-range or the like where the power is not transmitted to the continuously variable transmission. In that hydraulic control system of the prior art, however, one specific oil pressure is employed as the detecting oil pressure by using the hydraulic switch in place of the oil pressure sensor. This makes it probable that the learning correction cannot always be precisely made on the oil pressure over a wide practical range.

In an electrically activated hydraulic device such as a linear solenoid, on the other hand, there may be a difference between the characteristics in the pressure rising process and the characteristics in the pressure falling process. With a large characteristic difference or hysteresis, the oil pressure cannot be precisely controlled. Moreover, the hydraulic control system of the prior art is constructed to detect one specific oil pressure with the switch. This construction makes it disadvantageously impossible to detect the width of the hysteresis.

SUMMARY OF THE INVENTION

An object of the invention is to provide a hydraulic control system capable of learning and correcting properly the instruction value of an oil pressure to be used in the transmission.

Another object of the invention is to provide a control system capable of learning and correcting the oil pressure without affecting the active state of the transmission adversely.

A first feature of the invention resides in that the rotating speed of a prime mover connected to a hydraulic pump is raised with the transmission being stopped, in that instruction signals for generating a plurality of oil pressures is outputted in the stop state, in that the oil pressures corresponding to the individual instruction signals, and in that the instruction value of the oil pressure is learned and controlled on the basis of the detection result. On the other hand, a second feature of the invention resides in that the instruction signals for generating the plurality of oil pressures are outputted, in that the oil pressures corresponding to the individual instruction signals are detected, and in that the instruction values of the oil pressures are learned and controlled on the basis of the detection results.

According to the invention, more specifically, there is provided a hydraulic control system for generating an oil pressure by turning a prime mover connected to a hydraulic pump and for outputting an oil pressure instruction signal to an electrically activated pressure modulating mechanism, to modulate the oil pressure generated in the hydraulic pump to an oil pressure according to the instruction signal and to feed the modulated oil pressure to a transmission. The hydraulic control system executes controls of: raising the rotating speed of the prime mover while the transmission is not rotated by the prime mover, to increase the output volume of the hydraulic pump; oil pressure instructing for outputting a plurality of instruction signals of different pressure instruction values to the pressure modulating mechanism while the output volume of the hydraulic pump is increased, to output oil pressures at a plurality of pressure levels; detecting the oil pressure to be modulated and fed to the transmission, at a plurality of pressure levels; and learning and correcting the instruction signals on the basis of the pressure instruction value outputted by the oil pressure instructing control and the oil pressure detected by the oil pressure detecting control.

In the invention, therefore, the output pressure of the hydraulic pump is raised by increasing the rotating speed of the prime mover while the transmission is not rotated by the prime mover. Even with the transmission being stopped, therefore, the oil pressure to be generated by the hydraulic pump or the oil pressure source can be to a pressure at the highest level in the acting state of the transmission. In addition, the signals at the plurality of pressure instruction values are outputted. Without any manipulation to activate the transmission with applying the high pressure to the transmission, therefore, it is possible to generate and detect the oil pressure in the practical state of the transmission and to make the learning correction of the oil pressure.

On the other hand, the hydraulic control system of the invention execute controls of oil pressure instructing for outputting an instruction signal at a predetermined pressure instruction value to an electrically active pressure modulating mechanism to output an oil pressure at a predetermined pressure level; detecting the oil pressure to be modulated and fed to the transmission, at a plurality of pressure levels; learning and correcting the instruction signals on the basis of the pressure instruction value outputted by the oil pressure instructing control and the oil pressure detected by the oil pressure detecting control; and raising the rotating speed of the prime mover when an output timing of the oil pressure instruction signal is detected.

In the hydraulic control system of the invention thus constructed, therefore, when the instruction signal to output the oil pressure at the predetermined level is outputted, the rotating speed of the prime mover is accordingly increased to increase the output volume of the hydraulic pump. As the oil pressure is detected, moreover, the learning and correction of the instruction signal is made on the basis of the detected oil pressure and the pressure instruction value according to the instruction signal. In order to learn the oil pressure, therefore, the oil pressure is retained for the learning by increasing the rotating speed of the prime mover so that the proper oil pressure can be learned.

According to the invention, moreover, there is provided a hydraulic control system for generating an oil pressure from a hydraulic pump by turning a prime mover, as connected to a transmission capable of selecting a non-running shift position transmitting no power and the hydraulic pump, and for outputting an oil pressure instruction signal to an electrically activated pressure modulating mechanism, to modulate the oil pressure generated in the hydraulic pump to an oil pressure according to the instruction signal and to feed the modulated oil pressure to a transmission. The hydraulic control system executes controls of: raising the rotating speed of the prime mover, while the non-running shift position is selected and/or where the vehicle is stopped, to increase the output volume of the hydraulic pump; oil pressure instructing for outputting a plurality of instruction signals of different pressure instruction values to the pressure modulating mechanism while the output volume of the hydraulic pump is increased, to output oil pressures at a plurality of pressure levels; detecting the oil pressure to be modulated and fed to the transmission, at a plurality of pressure levels; and learning and correcting the instruction signals on the basis of the pressure instruction value outputted by the oil pressure instructing control and the oil pressure detected by the oil pressure detecting control.

In the invention, therefore, either while the transmission is not transmitting the power and while the vehicle is stopped, or while the vehicle is stopped, the rotating speed of the prime mover is increased to raise the output pressure of the hydraulic pump. Even while the transmission is stopped, therefore, the oil pressure to be generated by the hydraulic pump or the oil pressure source is as high as the highest level in the acting state of the transmission. In addition, the signals of the plurality of pressure instruction values are outputted so that the generation and detection of the oil pressure in the practical state of the transmission and the learning and correction of the oil pressure can be performed without any operation to activate the transmission with applying the high pressure to the transmission.

In the invention, on the other hand, at the rotating speed raising control, the rotating speed of the prime mover can be raised to a predetermined rotating speed larger than the rotating speed at which the hydraulic pump outputs an oil pressure higher than the highest pressure used in the transmission. Here, the predetermined rotating speed can be made to exceed the idling speed when the vehicle is stopped.

With this construction, therefore, the pressure of the oil pressure source at the time of the learning control of the oil pressure does not disperse so that a highly precise learning control can be made.

In the invention, moreover, the hydraulic control system can further executed a learning instruction control for outputting instructions to perform, for a predetermined time period: the increase in the rotating speed of the prime mover by the rotating speed raising control; the output of the instruction signal of the pressure instruction value to the pressure modulating mechanism by the oil pressure instructing control; the detection of the oil pressure by the oil pressure detecting control; and the learning and correction of the instruction signals by the learning and correction control. Here, the predetermined time period may be a term by the time when the vehicle is delivered to a purchaser.

With this construction, therefore, the learning and correction of the oil pressure in the inactive state of the transmission is executed for the predetermined time period so that the learning and correction of the oil pressure can be made easily without affecting the actions of the transmission.

In the invention, moreover, the predetermined time period can be a term before a vehicle having the transmission mounted thereon is shipped from a factory.

With this construction, therefore, the rotating speed of the prime mover is increased in the manufacturing factory of the vehicle so that its operations/works can be easily done. As a result, the learning and correction of the oil pressure can be easily operated in an improved high correction precision.

The hydraulic control system can further execute rounding oil pressure instructing control for outputting an instruction signal to instruct an oil pressure higher than that to be used for the learning and correction, before the oil pressure instructing control outputs the instruction signal for instructing the oil pressure to be used in the learning and correction.

With this construction, therefore, the pressure modulating mechanism is once activated, and the learning and correction of the oil pressure is made after the actions of the mechanism are smooth, so that the learning correction can be precisely made.

The hydraulic control system of the invention can further execute correction control for correcting the pressure instruction value for the pressure modulating mechanism in an oil pressure increasing side, before the output volume of the hydraulic pump is increased by the rotating speed raising control to make the learning and correction, thereby to feed an oil pressure higher than the pressure instruction value to the transmission.

With this construction, therefore, the oil pressure to be fed to the transmission before the completion of the learning and correction of the oil pressure is higher than the pressure instruction value. In other words, the transmission is fed with an oil pressure which is shifted to a higher level than the estimated oil pressure. Therefore, the contact pressure at the frictionally contacting portions for transmitting the torque is so sufficiently higher than the transmission torque so that the trouble such as the slippage can be prevented in advance.

In the hydraulic control system of the invention, moreover, the pressure modulating mechanism can have a non-modulating range in which the output oil pressure accompanying the change in the instruction signal does not change, and the oil pressure instructing control can output an oil pressure other than that in the non-modulating range, as the pressure instruction value.

With this construction, therefore, the learning control is not made in the non-modulating pressure range in which no correlation holds between the pressure instruction value and the generated pressure. It is, therefore, possible to prevent the learning and correction precision and the oil pressure control precision in advance from any deterioration.

Moreover, the hydraulic control system of the invention can further execute decision control for deciding that at least one of the rotating speed of the prime mover and its fluctuation is within predetermined ranges which are preset according to the individuals, and the oil pressure instructing control can output the plurality of instruction signals where the rotating speed of the prime mover or its fluctuation falls within the individual predetermined ranges.

With this construction, therefore, the learning and correction of the oil pressure is made while the prime mover and the hydraulic pump driven by the former are sufficiently high and stable in their rotating speeds, so that the control precision of the oil pressure can be improved.

According to the invention, on the other hand, there is provided a hydraulic control system for generating an oil pressure by turning a prime mover connected to a hydraulic pump and for outputting an oil pressure instruction signal to an electrically activated pressure modulating mechanism, to modulate the oil pressure generated in the hydraulic pump to an oil pressure according to the instruction signal and to feed the modulated oil pressure to a transmission. The hydraulic control system executes controls of: detecting the speed of a vehicle having the transmission mounted thereon; oil pressure instructing control for outputting an instruction signal at a predetermined pressure instruction value to the pressure modulating mechanism, when the vehicle speed is higher than a predetermined reference vehicle speed and is stable, to output oil pressures at a plurality of pressure levels; detecting the oil pressure to be modulated and fed to the transmission; and learning and correcting the instruction signals on the basis of the pressure instruction value outputted by the oil pressure instructing control and the oil pressure detected by the oil pressure detecting control.

In the hydraulic control system thus constructed, therefore, while the vehicle is running at a stable speed higher than a predetermined value, the instruction signal of the predetermined pressure instruction value is outputted, and the oil pressure is detected so that the learning and correction of the instruction oil pressure is made on the basis of the pressure instruction value and the detected pressure. As a result, it is possible to correct the deterioration in the control precision of the oil pressure due to the aging of the control device such as the pressure modulating mechanism.

Especially if the learning and correction are made while the rotations of the prime mover are stable at a predetermined or higher vehicle speed and during a deceleration, or preferably if the rotating speed of the prime mover is stable and higher than a predetermined value sufficient for the output volume of the hydraulic pump, it is possible to make the learning and correction of the oil pressure highly precisely all over the practical range.

In the hydraulic control system of the invention, on the other hand, the oil pressure instructing control can include a control for outputting an instruction signal at the predetermined pressure instruction value in the rising procedure of output oil pressure of the pressure modulating mechanism, and an instruction signal at the predetermined pressure instruction value in the falling procedure of the output oil pressure of the pressure modulating mechanism, and the oil pressure detecting control can detect an oil pressure according to the pressure instruction value in the rising procedure of the output oil pressure of the pressure modulating mechanism and an oil pressure according to the pressure instruction value in the falling procedure of the output oil pressure of the pressure modulating mechanism.

With this construction, therefore, where the deviation (or hysteresis) is between the oil pressure generated in the rising procedure of the pressure and the oil pressure generated in the falling procedure even for the identical pressure instruction value, the hysteresis can be detected. It is also possible on the basis of the detection result whether the transmission or the hydraulic control system is proper or improper.

In the hydraulic control system of the invention, moreover, the pressure instruction value may include at least any two of the highest pressure value in the using range of the transmission, an average oil pressure value in the ordinary running state which is the most frequent for the vehicle having the transmission mounted thereon, and the lowest pressure value in the using range of the transmission.

With this construction, therefore, the oil pressure in the practical range of the transmission can be learned and corrected over the wide range so that the control precision of the oil pressure is improved.

Moreover, the hydraulic control system of the invention can further execute an inhibition control for inhibiting the learning and correction, where either a deviation between the pressure instruction value and the oil pressure detected by the oil pressure detecting control or the learning and correction based on the pressure instruction value and the oil pressure detected by the oil pressure detecting control is higher than a predetermined value.

With this construction, therefore, where the oil pressure generated deviates largely from the pressure instruction value, it is decided that a mechanical trouble exceeding the individual difference occurs in the pressure modulating mechanism. Therefore, the learning and correction can be inhibited for a mechanical repair.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENTS

Figure 5:
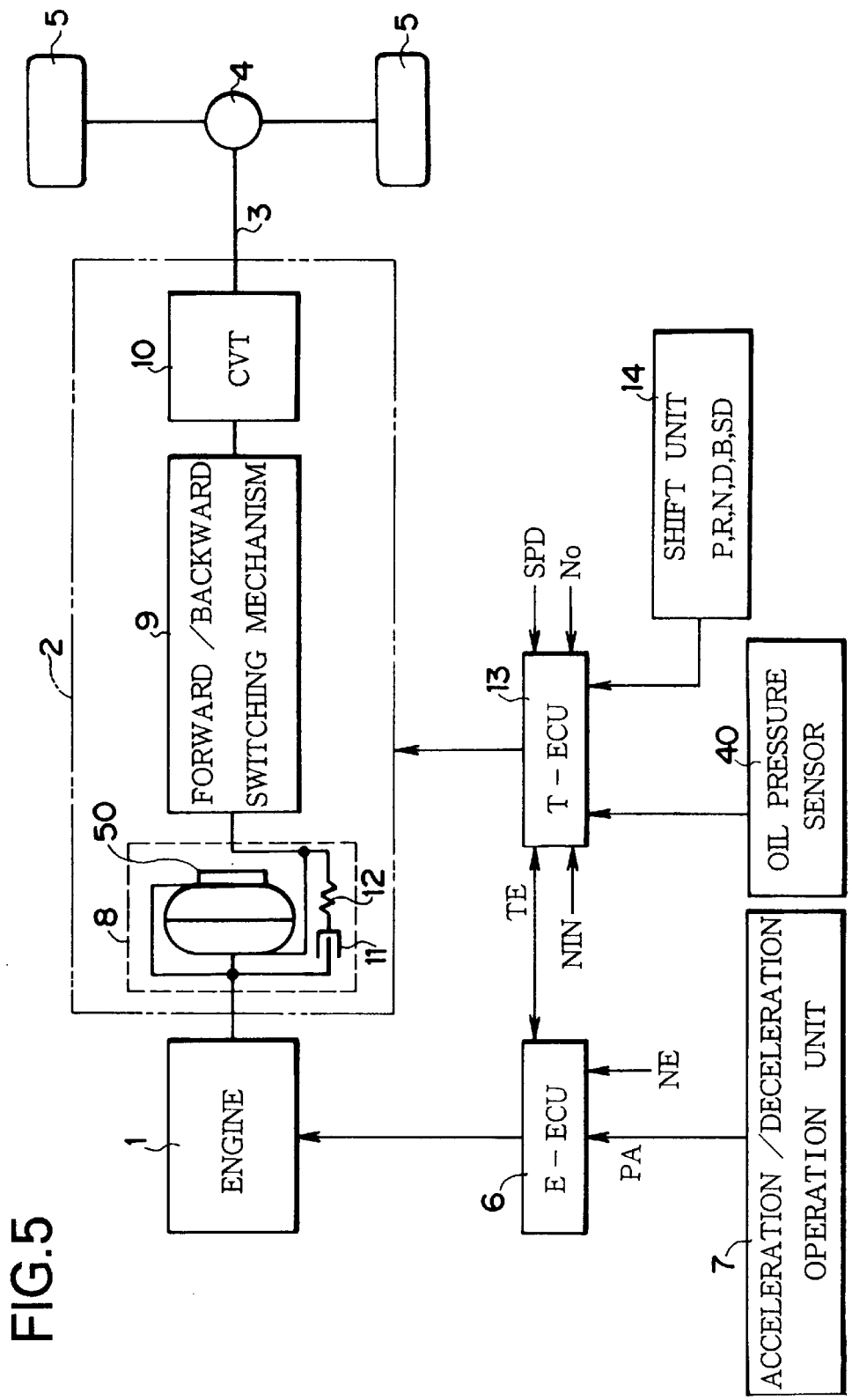
FIG. 5 is a block diagram schematically showing a drive system of a vehicle, to which the invention is directed, and a control system for the drive system.

The invention will be specifically described in connection with its embodiments. First of all, here will be described one example of a power transmission line of a vehicle, to which the invention is directed. In FIG. 5, a prime mover 1 is connected to a transmission mechanism 2, the output shaft 3 of which is connected through a differential unit (or shortly a differential) 4 to right and left drive wheels 5. Here, the prime mover 1 includes a variety of prime movers to be employed in the vehicle, such as an internal combustion engine, e.g., a gasoline engine or Diesel engine, an electric motor or a unit combining those internal combustion engine and electric motor. In the following description, the prime mover 1 is exemplified either by the so-called "direct injection gasoline engine" which can perform a homogeneous combustion or a stratified combustion, or by the gasoline engine which is equipped with an electronic throttle valve capable of controlling the throttle opening electrically freely.

This engine 1 is so constructed that it can be electrically controlled, and is equipped with an electronic control unit (E-ECU) 6 constructed mainly of a microcomputer for the electric control. This electronic control unit 6 is constructed to control at least the output of the engine 1. This electronic control unit 6 is fed with an output shaft speed or engine speed NE and drive demands including an accelerator pedal depression or opening PA, as the data for their controls.

These drive demands are, in short, signals for increasing/decreasing the output of the engine 1, and can adopt either a operation signal of an accelerating/decelerating operation unit 7 such as an accelerator pedal to be operated by the driver, or a signal generated by processing the opeation electrically. In addition, there is adopted a drive demand signal which comes from a (not-shown) cruise control system for keeping the vehicle speed at a set value.

On the other hand, the transmission mechanism 2 is constructed to include a fluid coupling mechanism 8, a forward/backward switching mechanism 9 and a continuously variable transmission (CVT) 10. The fluid coupling mechanism 8 is, in short, the device which is constructed to transmit the torque through a fluid or oil between an input member and an output member. This device is exemplified by a torque converter which is adopted in the ordinary vehicle. On the other hand, this fluid coupling mechanism 8 is provided with a lock-up clutch 11. This lock-up clutch 11 is the clutch which is constructed to couple the input member and the output member directly through mechanical means such as the friction discs, and is equipped with a damper 12 made of an elastic member such as a shock-absorbing coil spring.

At a position close to the fluid coupling mechanism 8, moreover, there is disposed a hydraulic pump 50 which is rotationally driven by the engine 1 or the prime mover so that its output pressure is raised according to the engine speed. Specifically, the hydraulic pump 50 is arranged between the fluid coupling mechanism 8 and the forward/backward switching mechanism 9. When the fluid coupling mechanism 8 is provided for driving the engine 1 continuously even on a stopped vehicle, an automatic clutch to be automatically applied/released on the basis of the state of the vehicle can be employed in place of the aforementioned fluid coupling mechanism 8.

The fluid coupling mechanism 8 is connected at its input member to the output member of the engine 1 and at its output member to the input member of the forward/backward switching mechanism 9. This forward/backward switching mechanism 9 is constructed of a double-pinion type planetary gear mechanism, for example. The forward/backward switching mechanism 9 is equipped with: an input element of one of a sun gear and a carrier; an output element of the other; brake means for fixing a ring gear selectively; and clutch means for connected any two rotary elements of the three elements of the sun gear, the carrier and the ring gear selectively to integrate the entire planetary gear mechanism. In short, the forward/backward switching mechanism 9 is constructed to set the forward state by applying the clutch means and to set the backward state by applying the brake means.

The continuously variable transmission 10, as shown in FIG. 5, is a mechanism capable of the ratio between the rotating speed of a member on its input side and the rotating speed of a member on its output side, i.e., a gear ratio steplessly (or continuously), and can adopt a belt type continuously variable transmission or a toroidal type continuously variable transmission. One example of the continuously variable transmission 10 will be briefly described with reference to FIG. 5. This mechanism 10 is constructed to include: a drive side pulley (or primary pulley) 20; a driven side pulley (or secondary pulley) 21; and a belt 22 wound on those pulleys 20 and 21. These pulleys 20 and 21 are individually provided with stationary sheaves 23 and 24, and movable sheaves 25 and 26 for moving toward and away from the stationary sheaves 23 and 24. Further provided are hydraulic actuators 27 and 28 for pushing the movable sheaves 25 and 26 toward the stationary sheaves 23 and 24.

The drive pulley 20 is mounted on an input shaft 29, and the drive pulley 21 is mounted on an output shaft 30 arranged in parallel with the input shaft 29. To the hydraulic actuator 28 in the drive pulley 21, moreover, there is fed the oil pressure which accords to the drive demands calculated on the basis of the demanded output represented by the accelerator opening PA so that the belt 22 is given the tension necessary for transmitting the torque. To the hydraulic actuator 27 of the drive pulley 20, on the other hand, there is fed the oil pressure for establishing the gear ratio to equalize the rotating speed of the input shaft 29 to the target input value. In short, by changing the groove widths (i.e., the gaps between the stationary sheaves 23 and 24 and the movable sheaves 25 and 26) in the individual pulleys 20 and 21, the winding radii of the belt 22 on the individual pulleys 20 and 21 are changed to larger and smaller values to execute the speed change. By feedback-controlling the oil pressure on the drive pulley 20 on the basis of the deviation between the real input speed and the target input speed, more specifically, the speed change is executed so that the changing rate is the higher for the larger deviation.

The feed and release of the oil pressure to the drive pulley 20 are effected by the flow controls, for which a valve mechanism is provided, as will be described in the following. With the hydraulic actuator 27, specifically, there are connected a first flow control valve 31 for feeding a line pressure and a second flow control valve 32 connected to the drain. To the control portions of these flow control valves 31 and 32, respectively, there are connected duty solenoid valves 33 and 34 for outputting the higher control pressure at the higher duty ratios thereby to increase the individual openings or flow rates of the flow control valves 31 and 32. By enlarging the opening of the first flow control valve 31 to augment the flow rate of the pressure oil, more specifically, the groove width of the drive pulley 20 is narrowed to effect the upshift abruptly. By enlarging the opening of the second flow control valve 32 to increase the pressure releasing rate from the hydraulic actuator 27 on the drive side pulley 20, on the contrary, the groove width of the drive pulley 20 is widened to effect the downshift abruptly. Thus, the construction is made to duty-control the shifting speed.

On the other hand, the hydraulic actuator 28 on the side of the driven pulley 21 is so fed with the oil pressure that the clamping force of the belt 22 may be a pressure according to the torque to be transmitted. As this pressure modulating mechanism, there are provided a pressure modulating valve 35 and a solenoid valve 36 for determining the pressure regulating level, i.e., the output pressure of the pressure modulating valve 35. This pressure modulating valve 35 is exemplified by a spool type valve, which is provided with a control port 37 for causing the control pressure to act on one end side of the spool and a feedback port 38 for causing the output pressure to act as the feedback pressure on the other end side of the spool. Thus, the pressure modulating valve 35 is constructed to modulate a line pressure PL in accordance with the control pressure fed to the control port 37 thereby to feed the modulated pressure from an output port 39 to the hydraulic actuator 28 on the side of the driven pulley 21.

On the other hand, the solenoid valve 36 is a duty control valve which is electrically controlled ON/OFF to open/close the port repeatedly. In accordance with the duty ratio, i.e., the ratio between the ON state and the OFF state for a unit time, the solenoid valve 36 modulates and feeds the solenoid modulator pressure as the control pressure to the control port 37 of the modulating valve 35. Here in the shown embodiment, for the higher duty ratio, the output pressure (or the control pressure) becomes the lower so that the pressure modulating valve 35 has the lower modulated pressure. As a result, the oil pressure to be fed to the hydraulic actuator 28 becomes the lower. On the other hand, the solenoid valve 36 can also be exemplified by a linear solenoid valve for outputting an oil pressure substantially proportional to the value of the electric current.

Moreover, an oil pressure sensor 40 for detecting the oil pressure to be thus fed to the hydraulic actuator 28 is connected with an oil line 41 which provides the communication between the pressure modulating valve 35 and the hydraulic actuator 28. This oil pressure sensor 40 is a sensor for measuring (or detecting) the oil pressure of the hydraulic actuator 28 to output a signal according to the oil pressure measured, and is employed for the learning control of the oil pressure, as will be described hereinafter. Therefore, this oil pressure sensor 40 can be so constructed as is attached to the oil line 41 at all times. Alternatively, the oil pressure sensor 40 can be attached to the oil line 41 only at the time of the learning control of the oil pressure. In a predetermined portion of the oil line 41, for example, there may be formed a connection port, to which the oil pressure sensor 40 is attached, if necessary, so that it may be detached from the oil line 41 when it is unnecessary to detect the oil pressure. At the same time, a suitable plug may be attached to shut the connection port.

Figure 6:
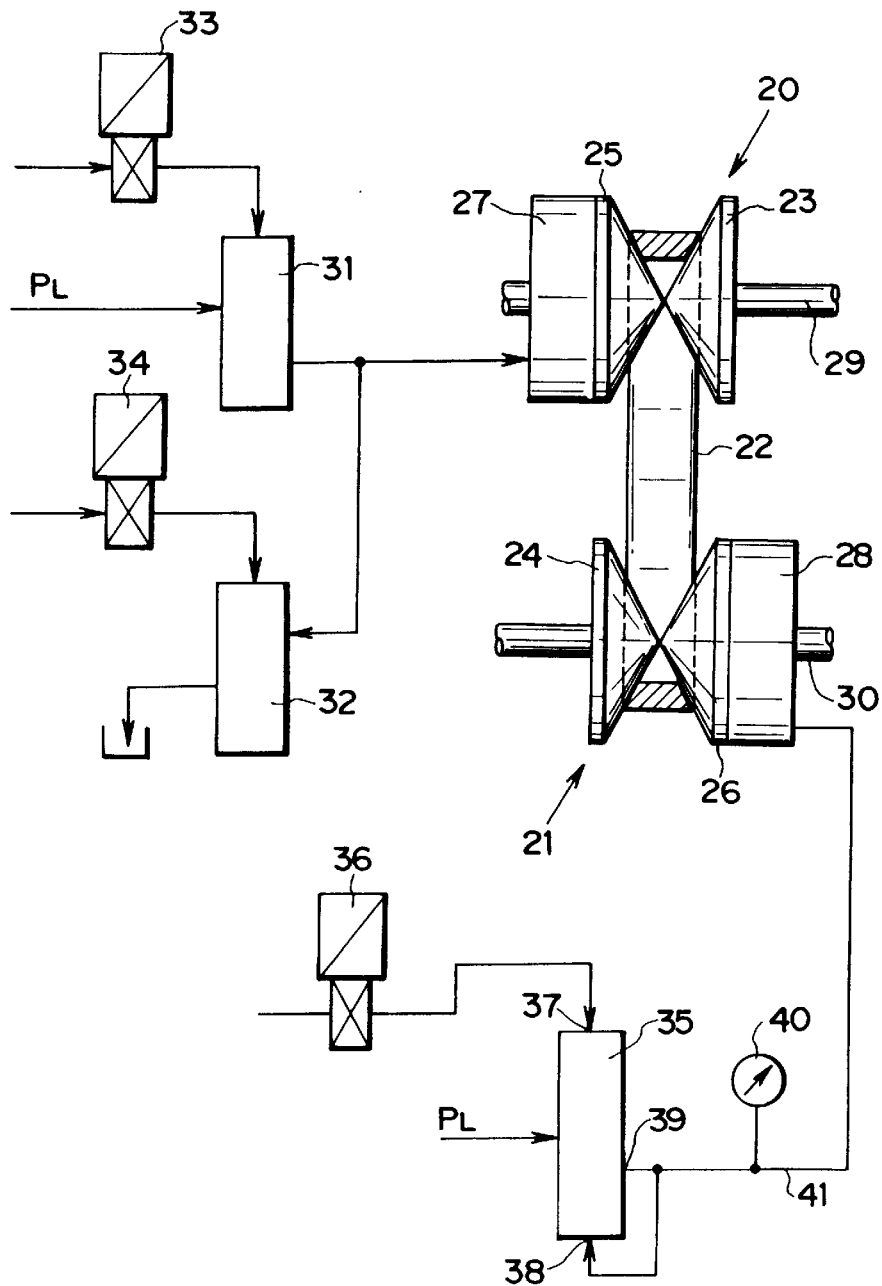
FIG. 6 is a diagram showing one example of a continuously variable transmission schematically.

In the continuously variable transmission 10 shown in FIG. 6, therefore, a gear ratio on the slowest side (i.e., a maximum gear ratio) $\gamma_{max}$ is set when the winding radius of the belt 22 on the drive pulley 20 is the minimum and when the winding radius of the belt 22 on the drive pulley 21 is the maximum. On the contrary, a gear ratio on the fastest side (i.e., a minimum gear ratio) $\gamma_{min}$ is set when the winding radius of the belt 22 on the drive pulley 20 is the maximum and when the winding radius of the belt 22 on the drive pulley 21 is the minimum.

The controls of the individual states of the application/release and the slipping partial application of the lock-up clutch 11 in the transmission mechanism and the controls of the switching of the forward/backward switching actions of the mechanism 9 and the gear ratio in the continuously variable transmission 10 are basically made on the basis of the running state of the vehicle. For these controls, there is provided an electronic control unit (T-ECU) 13 which is constructed mainly of a microcomputer.

This electronic control unit 13 is connected in a data communicating manner with the aforementioned electronic control unit 6 for the engine, and is fed with control data including a vehicle speed SPD, the output speed No and the input speed NIN of the transmission mechanism 2, and the signal from the oil pressure sensor 40. With the electronic control unit 13, there is electrically connected with a shift unit 14 for selecting the individual states (or positions) for the transmission mechanism 2: the stop state (or the parking position: P); the backward state (or the reverse position: R); the neutral state (or the neutral position: N); the automatic forward state (or the drive position: D); the state of adopting the pumping loss of the engine 1 as the braking force (or the brake position: B); and the state of inhibiting the setting of the gear ratio on a higher speed side than a predetermined value (or the SD position).

The transmission of the torque in the continuously variable transmission 10 is effected through the friction between the belt 22 and the individual pulleys 20 and 21. If the clamping force of the belt 22 (i.e., the tension of the belt 22) by the individual pulleys 20 and 21 is lower than the torque to be transmitted, therefore, the belt 22 slips to deteriorate the durability due to the wear or the like. If the clamping force of the belt 22 is excessive over the torque to be transmitted, on the contrary, the belt 22 is exposed to the excessive tension so that its durability is deteriorated. Therefore, the torque to be transmitted by the continuously variable transmission 10 changes with the load (e.g., the accelerator opening) on the engine 1 so that the clamping force of the belt 22, i.e., the oil pressure to be fed to the hydraulic actuator 28 on the side of the driven pulley 21 is controlled on the basis of the engine load. More specifically, the pressure instruction value, as determined on the basis of the engine load, are calculated by the electronic control unit 13, and the instruction signal according to the pressure instruction value is outputted to the solenoid valve 36 so that the solenoid valve 36 acts at the duty ratio according to the instruction signal.

Due to an individual difference of the pressure modulating mechanism such as the solenoid valve 36 or the pressure modulating valve 35, however, an oil pressure different from the pressure instruction value may be fed to the hydraulic actuator 28. In order to correct this error feed, the learning control of the oil pressure is executed. One example of this learning control is shown in a flow chart in FIG. 1.

Figure 1:
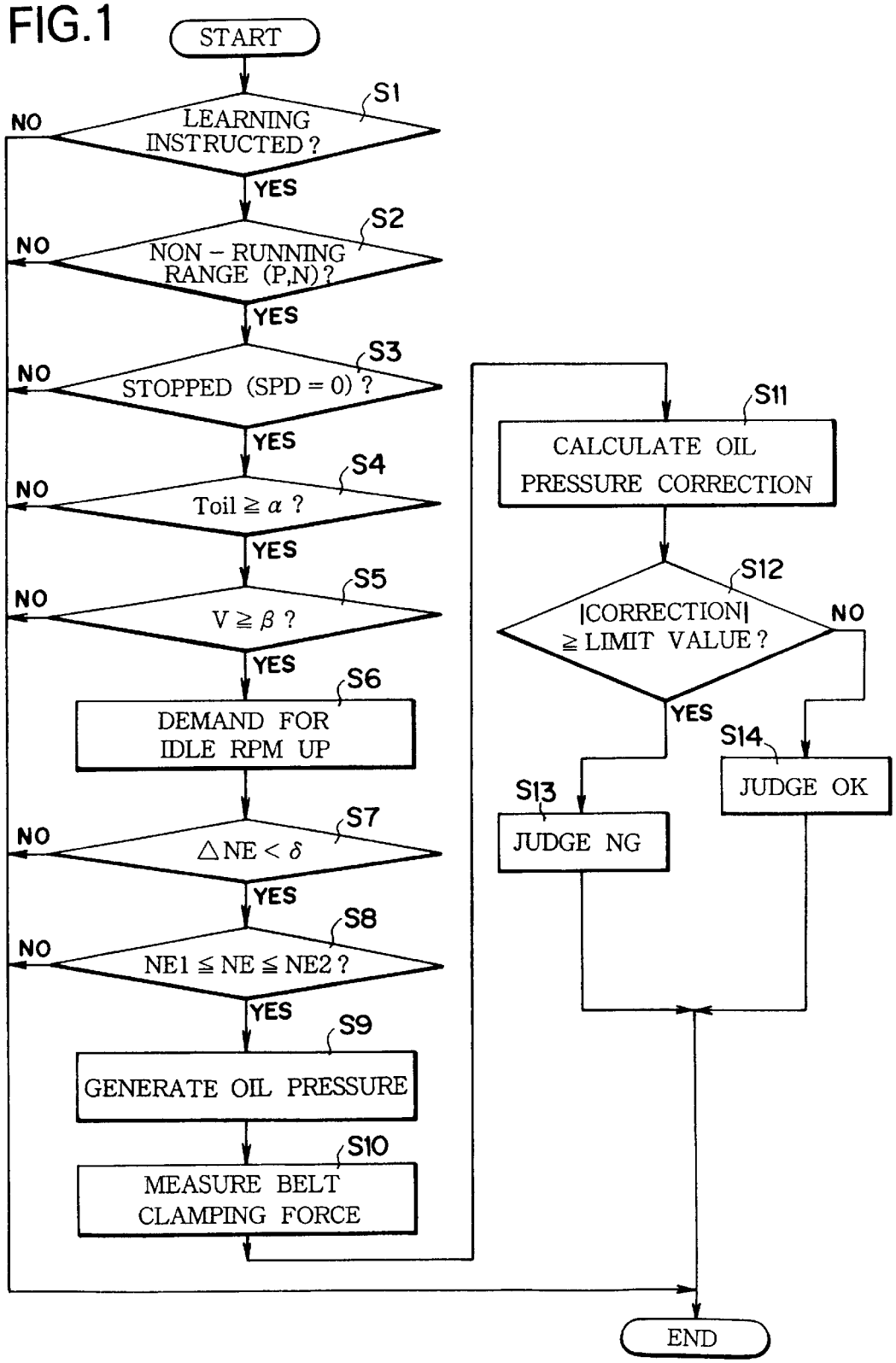
FIG. 1 is a flow chart showing an example of the control to be executed by a hydraulic control system according to the invention.

In FIG. 1, it is decided at first (at Step S1) whether or not a learning is instructed. The pressure modulating level of the pressure modulating valve 35 is set independently of the running state of the vehicle, as will be described. In order that the instruction of this kind may not occur during the running, therefore, the learning and correction is prepared as a special instruction signal so that it is made only when that instruction is made. Therefore, this learning instruction can also be outputted for a specific time period before the vehicle is shipped from a factory. Alternatively, the learning instruction can further be outputted at a service shop for a time period by the time when the vehicle is delivered to the purchaser. Alternatively, the time period is set by the time when the travel distance of the vehicle reaches a predetermined value. The control at Step S1 of thus determining the time period to output the learning instruction corresponds to learning instruction control of the invention.

Where the answer of Step S1 is NO because no learning is instructed, the routine of FIG. 1 is ended. Where the answer of Step S1 is YES because the learning is instructed, on the contrary, it is decided (at Step S2) whether or not the shift range set in the transmission mechanism 2 is a non-running range (e.g., the P-position or N-position). This decision can be made on the basis of the output signal from the shift unit 14. Where the answer of this Step S2 is NO, that is, where a running range is set so that the engine 1 or the prime mover and the continuously variable transmission 10 are connected, this routine is ended without any control so as to avoid the action of the continuously variable transmission 10 which might otherwise be caused to act by the learning and correction of the oil pressure.

Where the answer of Step S2 is YES because the non-running range is set, on the contrary, the continuously variable transmission 10 is not connected to the engine 1 so that it is not rotationally driven even with the learning and correction of the oil pressure. Therefore, the routine advances to next Step S3, at which it is decided whether or not the vehicle is stopped. This decision can be made either on the basis of the vehicle speed SPD or on the basis of the acting condition of a side brake (or a hand brake). If the vehicle is running, it is highly probable to employ the continuously variable transmission 10. It is, therefore, unpreferable to make the learning and correction of the oil pressure. Where the answer of Step S3 is NO, therefore, this routine is ended without any control.

Where the answer of Step S3 is YES because the vehicle is stopped, on the contrary, it is decided (at Step S4) whether or not the oil temperature Toil of the transmission mechanism 2 or the continuously variable transmission 10 is higher than a predetermined reference temperature $\alpha$. While the oil temperature Toil is low, the high viscosity of the oil makes it difficult to control a precise oil pressure control. If the oil temperature Toil is lower than the reference value $\alpha$, that is, if the answer of Step S4 is NO, therefore, this routine is ended without any control. Where the answer of Step S4 is YES because the oil temperature Toil is over the reference value $\alpha$, on the contrary, it is decided (at Step S5) whether or not a voltage V is higher than a reference voltage $\beta$.

The clamping force of the belt 22 is set by duty-controlling the solenoid valve 36, as has been described hereinbefore. Where the supply voltage for driving the solenoid valve 36 is low, therefore, the control cannot be made, as expected. Therefore, it is premised for the learning and correction of the oil pressure that the voltage V is higher than the reference voltage $\beta$. Where the answer of Step S5 is NO, therefore, the premising condition is not satisfied. Therefore, this routine is ended without any control. Where the answer of Step S5 is YES, on the contrary, it is demanded for raising the idle speed (at Step S6).

It is preferable that the learning control of the oil pressure is made under the conditions where no influence is given to the running of the vehicle and where the continuously variable transmission 10 is not acting. These states are exemplified by the state where the vehicle is stopped in the non-running range, as has been described hereinbefore, so that the vehicle is in the idling state although the engine 1 is acting. In the ordinary running state, on the contrary, the engine 1 is rotating at an engine speed more than the idling speed, and the oil pressure employed is the high pressure discharged by the hydraulic pump 50. In order to establish such high pressure at the time of the learning control of the oil pressure, therefore, the demand signal for increasing the idling speed is outputted from the electronic control unit 13 for the transmission to the electronic control unit 6 for the engine 1. In other words, the rotating speed of the prime mover is raised to a higher value than the ordinary idling speed at the time when the vehicle is stopped. Therefore, the hydraulic pump 50 is raised in its rotating speed and accordingly in its output pressure as the engine speed rises. Thus, the control at Step S6 corresponds to the rotating speed raising means of the invention. Here, the engine speed is raised either automatically or separately and independently of the operation of the accelerator. This operation is performed by controlling the electronic throttle valve electrically, for example. In short, no operation is required for the driver.

It is then decided (at Step S7) whether or not a fluctuation $\Delta NE$ of the engine speed NE per unit time is larger than a reference fluctuation $\delta$, that is, whether or not the rotation of the engine 1 is stable. Where the answer of this Step S7 is NO, this routine is ended without any control. This is because the hydraulic pump 50 is rotationally unstabilized, if the fluctuation $\Delta NE$ of the engine speed NE is high, to have an unstable output pressure.

It is further decided (at Step S8) whether or not the engine speed is within a predetermined speed range ($NE1 \leq NE \leq NE2$). The output pressure of the hydraulic pump 50 is determined by the engine speed NE and the accompanying rotating speed of the hydraulic pump 50. By predetermining the range of the engine speed NE neither too much nor too little for the learning and correction of the oil pressure, therefore, the control is made to confine the engine speed NE within the predetermined range. If the actual engine speed NE exceeds the range, however, the premising condition of the pressure of the oil pressure source fails to hold for the learning control of the oil pressure. Where the answer of Step S8 is NO, therefore, this routine is ended without any control. Here, the controls at Step S7 and Step S8 correspond to the decision control of the invention.

Where the answer of Step S8 is YES because the engine speed is necessarily and sufficiently large and stable, a detecting oil pressure is generated (at Step S9). The control at Step S9 corresponds to the oil pressure instructing control of the invention, and this is a control to output the instruction signal of a predetermined instruction oil pressure (or pressure instruction value) as a duty signal to the solenoid valve 36. One example of the instruction oil pressure is illustrated in FIG. 2.

Figure 2:
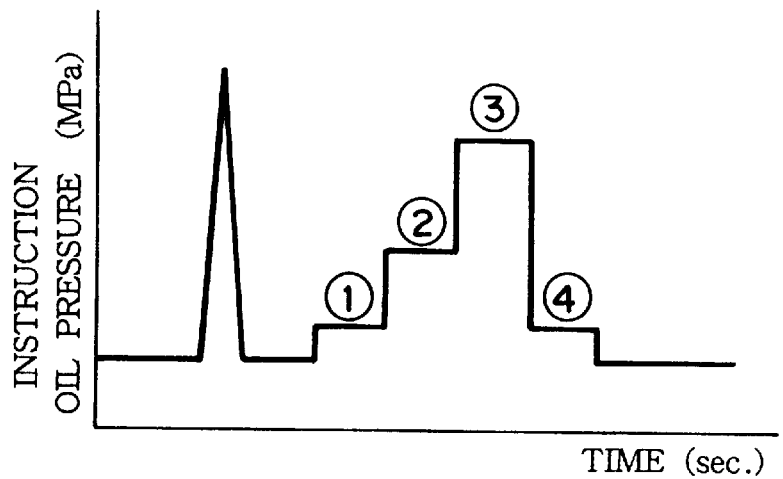
FIG. 2 is a diagram illustrating an example of an instruction pressure to be outputted by the hydraulic control system of the invention as an oil pressure to be detected.

In FIG. 2, the abscissa indicates the time axis, and an instruction signal for a rounding oil pressure is outputted at first. This is the signal of the instruction oil pressure, as illustrated by upward sharp lines in FIG. 2, for smoothing the action at the time of the learning control of the oil pressure by moving the moving part such as the spool on trial in the pressure modulating mechanism such as the solenoid valve 36 or the pressure modulating valve 35. It is, therefore, sufficient that the rounding oil pressure is outputted in a moment, and that the pressure is as high as the maximum level that is mechanically allowable or practiced. The control at Step S9 executing the control to output the instruction signal of such rounding oil pressure corresponds to the rounding oil pressure instructing control of the invention.

In the example shown in FIG. 2, three instruction oil pressure, i.e., a low pressure ①, an intermediate pressure ② and a high pressure ③ are sequentially outputted as the instruction signals for the oil pressure to be detected, and a low pressure ④ is then outputted as the instruction signal of the instruction oil pressure. Here, the "low pressure" is the lowest level in the practical range of the transmission and is such the so-called "leakage pressure" in the solenoid valve 36 as is higher than the pressure in the non-modulating pressure range exhibiting no change according to the duty ratio. The control at Step S9 for outputting an oil pressure higher than the pressure in that non-modulating pressure range, as the instruction oil pressure at the time of the learning control of the oil pressure.

On the other hand, the aforementioned "intermediate pressure" is an average oil pressure in the most frequent ordinary running state (i.e., the practical range) of the vehicle, that is, a predetermined pressure. Moreover, the "high pressure" is an oil pressure corresponding to the highest pressure in the practical range of the transmission. The example shown in FIG. 2 is constructed to output those three indication oil pressures of the low, intermediate and high pressures. In the invention, however, the construction may output the instruction signals of a plurality of pressure instruction values and may also output two of the three oil pressures or three or more oil pressures. Therefore, the control at Step S9 for outputting such instruction oil pressures corresponds to the oil pressure instructing control for outputting the pressure instruction values in the invention.

In the example shown in FIG. 2, on the other hand, the oil pressure to be outputted in the rising procedure of the instruction oil pressure and the oil pressure to be outputted in the falling procedure are different from each other, but an identical oil pressure may be outputted in the rising procedure and in the falling procedure. Moreover, the control at Step S9 for outputting the oil pressures to be detected as the instruction oil pressures individually in the rising procedure and in the falling procedure corresponds to the detecting oil pressure instructing control.

Next, the belt clamping force is measured (at Step S10). This belt clamping force is the oil pressure to be fed to the hydraulic actuator 28 of the driven pulley 21 and is measured (or detected) by the oil pressure sensor 40. Therefore, the control at Step S10 corresponds to the oil pressure detecting control of the invention.

Where there is neither any trouble nor any individual difference, the instruction oil pressure and the belt clamping force are identical to raise no deviation inbetween. With the trouble or the individual difference of the control device, however, a deviation is caused between the instruction oil pressure and the belt clamping force. An oil pressure correction is calculated (at Step S11) for correcting a control according to the deviation. The control at Step S11 corresponds to the learning and correction control of the invention.

It is further decided (at Step S12) whether or not the absolute value of the correction calculated at Step S11 is larger than the limit correction. Where the answer of Step S12 is YES, moreover, an NG (No Good) is judged (at Step S13). Where the correction has a rather large value, more specifically, the deviation is thought to come not from the belt clamping force due to the individual difference of the hydraulic control device but from the pressure based on some trouble. Therefore, the NG is judged as a product and is remedied by replacing the parts. In this case, the learning and correction of the oil pressure is not made. The control at Step S13 corresponds to the inhibition control of the invention.

Where the answer of Step S12 is NO, on the contrary, "OK" is judged (at Step S14). In this case, the learning and correction of the oil pressure are made. Specifically, the duty ratio is corrected so that the belt clamping force may be equalized to the instruction oil pressure, and the corrected duty ratio is updated and stored as a value for the instruction oil pressure.

Figure 3:
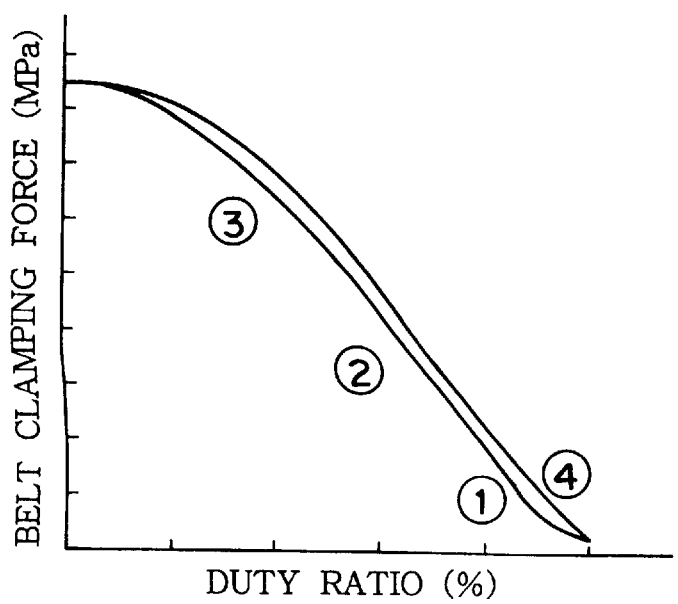
FIG. 3 is a diagram illustrating one example of the learned and corrected hydraulic characteristics.

One example of the characteristics of the oil pressure thus obtained is illustrated in FIG. 3 in relation to the duty ratio corresponding to the instruction oil pressure. Here are obtained three oil pressures as the instruction oil pressure which is outputted as the detecting oil pressure. The values among those three indication oil pressures in the measurement result are determined by proper interpolations. After the characteristics illustrated in FIG. 3 were obtained by the learning control, the belt clamping force is determined on the basis of the engine load or the like. Then, the duty ratio corresponding to the belt clamping force is calculated on the basis of FIG. 3, and the instruction signal corresponding to the duty ratio is outputted to the solenoid valve 36.

Between the characteristics (i.e., ① to ③ and their interpolations of FIG. 3) in the rising procedure for raising the instruction oil pressure gradually and the characteristics (i.e., ④ of its interpolation of FIG. 3) in the falling procedure for lowering the instruction oil pressure, as illustrated in FIG. 3, the latter characteristics have a higher oil pressure. In other words, the duty ratio of the latter characteristics is higher for the oil pressure. In the learning control of the oil pressure thus far described according to the invention, the instruction oil pressure at the "low pressure" is outputted both in the rising procedure and in the falling procedure, and the individual oil pressures are measured so that the deviation, i.e., the hysteresis between the characteristics in the rising procedure and the characteristics in the falling procedure can be detected.

This hysteresis is preferred to be as small as possible for enhancing the control precision of the oil pressure. Where the detected hysteresis exceeds a predetermined range, therefore, the "NG" may be judged to adopt the replacement or repair of the control device. The hydraulic control system thus constructed to detect the characteristics in the rising procedure and the characteristics in the falling procedure corresponds to the hydraulic control system of the invention.

By making the learning and correction of the instruction oil pressure for setting the belt clamping force, as has been described hereinbefore, the control precision of the oil pressure can be enhanced all over the practical range, to set the belt clamping force according to the engine load, i.e., the belt clamping force according to the torque to be transmitted. As a result, the situations such as the slippages between the belt 22 and the individual pulleys 20 and 21 or the application of an excessive tension to the belt can be prevented to improve the durability of the continuously variable transmission 10. It is also possible to avoid in advance the disadvantages such as the deterioration of the fuel economy, as might otherwise be caused by raising the oil pressure more than necessary. Moreover, the continuously variable transmission 10 is not activated at the learning time so that its durability can be improved. Still moreover, the increase in the engine speed for learning the oil pressure can be controlled automatically or electrically while requiring no operation of the driver, so that the learning and correction of the oil pressure can be easily made.

However, the continuously variable transmission 10 may have to be driven before the learning and correction of the control for setting the belt clamping force. In this case, too, the necessary torque has to be transmitted. In order to prevent the slippage of the belt, therefore, the hydraulic control system of the invention is constructed such that a belt clamping force higher than the indication oil pressure is set before the learning correction is completed.

Figure 4:
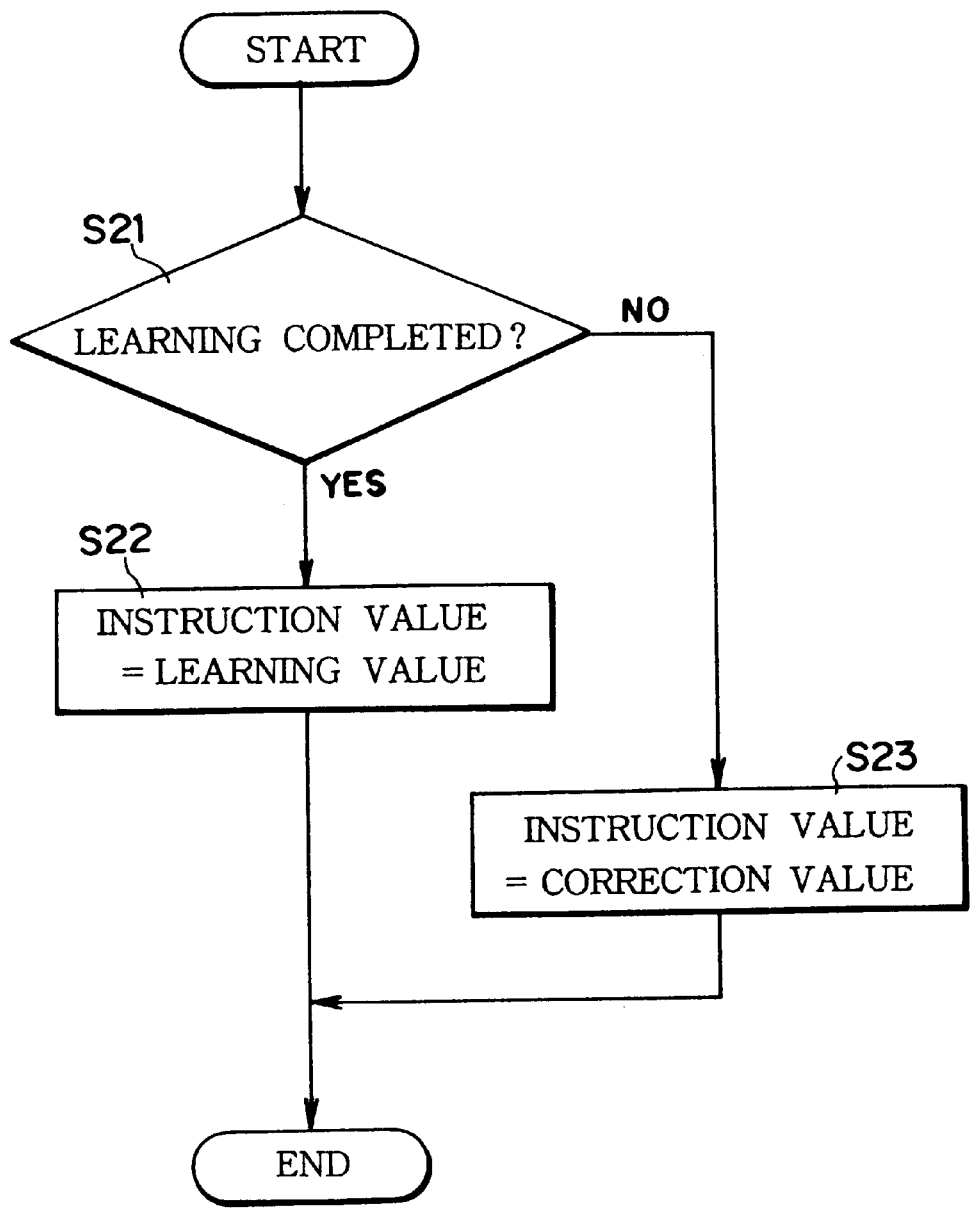
FIG. 4 is a flow chart for selecting pressure instruction values before and after the end of the learning and correction.

As specifically shown in FIG. 4, it is decided (at Step S21) whether or not the learning and correction is completed. If the learning and correction are completed, the learning value is adopted (at Step S22) as the instruction signal. Where the answer of Step S21 is NO because the learning and correction are not completed, the correction value is adopted (at Step S23) as the instruction signal. Specifically, the pressure instruction value is corrected to rise so that an oil pressure higher than the pressure instruction value set initially may be fed to the hydraulic actuator 28. In the aforementioned example, the correction is made to reduce the duty ratio. The control at Step S23 for making such correction corresponds to the correction control of the invention.

Even with a characteristic dispersion due to the individual differences in the hydraulic control device such as the solenoid valve 36, therefore, the belt clamping force to be set before the completion of the learning and correction is higher than the instructed pressure. Therefore, the frictional force necessary for the torque transmission can be generated between the belt 22 and the individual pulleys 20 and 21 thereby to avoid the trouble such as the slippage of the belt 22 in advance.

Here in the foregoing specific embodiment, the learning and correction are made when the vehicle is stopped and when the continuously variable transmission 10 is not activated. However, the hydraulic control system of the invention can also be constructed to make the learning correction of the belt clamping force of the oil pressure in the continuously variable transmission 10 while the vehicle is running. Specifically, the vehicle speed is detected, and it is decided whether or not the idle switch is ON, where the detected vehicle is higher than a predetermined value indicating a considerably high vehicle speed. Where the answer of the decision is YES, that is, where the idling state at the high vehicle speed is detected, the learning instruction can be outputted to execute the controls at and after Step S9 shown in FIG. 1.

In the embodiment thus constructed: the control for detecting the vehicle speed corresponds to the vehicle speed detecting control; the control (i.e., the control corresponding to Step S9 of FIG. 1) for outputting the signal of the pressure instruction value corresponds to the oil pressure instructing control of the invention; the control for detecting the oil pressure by the oil pressure sensor 40 corresponds to the oil pressure detecting control of the invention; and the control (i.e., the control corresponding to Step S11 shown in FIG. 1) for calculating the correction and correcting the instruction signal on the basis of the detected oil pressure corresponds to the learning and correction control of the invention.

In this learning and correction during the running, too, the vehicle speed is at a considerable value so that the output pressure of the hydraulic pump 50 rises. Therefore, the learning and correction of the oil pressure can be made all over the practical range of the continuously variable transmission 10. As a result, the control precision of the oil pressure such as the belt clamping force is improved. Even during the running, too, the learning and correction of the oil pressure is made during the idling of the engine 1 so that the oil pressure is stabilized to make a highly precise learning and correction.

Where the learning controls of the oil pressure thus far described are made while the vehicle is stopped or running, a suitable display is preferably executed during the controls. For example, an indication lamp is lit in the meter panel or instrument panel to notice the driver that the oil pressure is in the learning control. In the foregoing specific embodiment, on the other hand, there has been described the example in which the belt clamping force in the continuously variable transmission 10 is subjected to the learning controls. The invention should not be limited to the specific embodiment but could be applied to a system for controlling the oil pressure in another transmission such as a continuously variable transmission of toroidal type or a discontinuous transmission using gear trains.

Here will be collectively described the advantages to be obtained in the invention. According to the invention, as has been described hereinbefore, the output pressure of the hydraulic pump is raised by increasing the rotating speed of the prime mover while the transmission is not rotated by the prime mover. Even with the transmission being stopped, therefore, the oil pressure to be generated by the hydraulic pump or the oil pressure source can be to a pressure at the highest level in the acting state of the transmission. In addition, the signals at the plurality of pressure instruction values are outputted. Without any operation to activate the transmission with applying the high pressure to the transmission, therefore, it is possible to generate and detect the oil pressure in the practical state of the transmission and to make the learning and correction of the oil pressure. As a result, the precision of the oil pressure can be enhanced all over the practical range of the transmission, and the transmission can be improved in its durability because it is not activated.

According to the invention, on the other hand, when the instruction signal to output the oil pressure at the predetermined level is outputted, the rotating speed of the prime mover is accordingly increased to increase the output volume of the hydraulic pump. As the oil pressure is detected, moreover, the learning correction of the instruction signal is made on the basis of the detected oil pressure and the pressure instruction value according to the instruction signal. As a result, the oil pressure is retained for the learning by increasing the rotating speed of the prime mover so that the proper oil pressure can be learned.

According to the invention, moreover, either while the transmission is not transmitting the power and while the vehicle is stopped, or while the vehicle is stopped, the rotating speed of the prime mover is increased to raise the output pressure of the hydraulic pump. Even while the transmission is stopped, therefore, the oil pressure to be generated by the hydraulic pump or the oil pressure source is as high as the highest level in the acting state of the transmission. In addition, the signals of the plurality of pressure instruction values are outputted so that the generation and detection of the oil pressure in the practical state of the transmission and the learning and correction of the oil pressure can be performed without any operation to activate the transmission with applying the high pressure to the transmission.

According to the invention, moreover, in addition to the above-specified advantages, the pressure of the oil pressure source of the case of the learning control of the oil pressure does not disperse so that a highly precise learning control can be made.

According to the invention, moreover, in addition to the above-specified advantages, the learning and correction of the oil pressure in the inactive state of the transmission is executed for the predetermined time period so that the learning and correction of the oil pressure can be made easily without affecting the actions of the transmission.

According to the invention, moreover, in addition to the above-specified advantages, the rotating speed of the prime mover is increased in the manufacturing factory of the vehicle so that its operations/works can be easily done. As a result, the learning and correction of the oil pressure can be easily operated in an improved high correction precision.

According to the invention, moreover, in addition to the above-specified advantages, the pressure modulating mechanism is once activated, and the learning and correction of the oil pressure are made after the actions of the mechanism are smooth, so that the learning and correction can be precisely made.

According to the invention, moreover, in addition to the above-specified advantages, the oil pressure to be fed to the transmission before the completion of the learning and correction of the oil pressure is higher than the pressure instruction value. In other words, the transmission is fed with an oil pressure which is shifted to a higher level than the estimated oil pressure. Therefore, the contact pressure at the frictionally contacting portions for transmitting the torque is so sufficiently higher than the transmission torque so that the trouble such as the slippage can be prevented in advance.

According to the invention, moreover, in addition to the above-specified advantages, the learning control is not made in the non-modulating pressure range in which no correlation holds between the pressure instruction value and the generated pressure. It is, therefore, possible to prevent the learning and correction precision and the oil pressure control precision in advance from any deterioration.

According to the invention, moreover, in addition to the above-specified advantages, the learning and correction of the oil pressure are made while the prime mover and the hydraulic pump driven by the former are sufficiently high and stable in their rotating speeds, so that the control precision of the oil pressure can be improved.

According to the invention, on the other hand, while the vehicle is running, the learning and correction of the instruction oil pressure can be made. As a result, it is possible to correct the deterioration in the control precision of the oil pressure due to the aging of the control device such as the pressure modulating mechanism. Especially if the learning and correction is made while the rotations of the prime mover are stable at a predetermined or higher vehicle speed and during a deceleration, it is possible to make the learning and correction of the oil pressure highly precisely all over the practical range.

According to the invention, moreover, in addition to the above-specified advantages, where the deviation (or hysteresis) is between the oil pressure generated in the rising procedure of the pressure and the oil pressure generated in the falling procedure even for the identical pressure instruction value, the hysteresis can be detected. It is also possible on the basis of the detection result whether the transmission or the hydraulic control system is proper or improper.

According to the invention, moreover, in addition to the above-specified advantages, the oil pressure in the practical range of the transmission can be learned and corrected over the wide range so that the control precision of the oil pressure is improved.

According to the invention, moreover, in addition to the above-specified advantages, where the oil pressure generated deviates largely from the pressure instruction value, it is decided that a mechanical trouble exceeding the individual difference occurs in the pressure modulating mechanism. Therefore, the learning and correction can be inhibited for a mechanical repair.

What is claimed is:

1. A hydraulic control system for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising:

rotating speed raiser for raising a rotating speed of said prime mover while said transmission is not rotated by said prime mover, to increase an output volume of said hydraulic pump;

oil pressure instructor for outputting a plurality of instruction signals of different pressure instruction values to said pressure modulating mechanism while the output volume of said hydraulic pump is increased, to output oil pressures at a plurality of pressure levels;

oil pressure detector for detecting the oil pressure to be modulated and fed to said transmission, at a plurality of pressure levels; and learning and correction unit for learning and correcting said instruction signals on the basis of the pressure instruction value outputted by said oil pressure instructor and the oil pressure detected by said oil pressure detector.

2. A hydraulic control system according to claim 1,
wherein said rotating speed raiser raises the rotating speed of said prime mover to a predetermined rotating speed larger than the rotating speed at which said hydraulic pump outputs an oil pressure higher than the highest pressure used in said transmission.

3. A hydraulic control system according to claim 1, further comprising:

learning instructor for outputting instructions to execute, for a predetermined time period: the increase in the rotating speed of said prime mover by said rotating speed raiser; the output of the instruction signal of the pressure instruction value to said pressure modulating mechanism by said oil pressure instructor; the detection of the oil pressure by said oil pressure detector; and the learning and correction of said instruction signals by said learning and correction unit.

4. A hydraulic control system according to claim 3,
wherein said predetermined time period is a term before a vehicle having said transmission mounted thereon is shipped from a factory.

5. A hydraulic control system according to claim 1, further comprising:

rounding oil pressure instructor for outputting an instruction signal to instruct an oil pressure higher than that to be used for said learning and correction, before said oil pressure instructor outputs the instruction signal for instructing the oil pressure to be used in said learning and correction.

6. A hydraulic control system according to claim 1, further comprising:

corrector for correcting the pressure instruction value for said pressure modulating mechanism in an oil pressure increasing side, before the output volume of said hydraulic pump is increased by said rotating speed raiser to make the learning and correction by said learning and correction unit, thereby to feed an oil pressure higher than the pressure instruction value to the transmission.

7. A hydraulic control system according to claim 1, wherein said pressure modulating mechanism has a non-modulating range in which the output oil pressure accompanying the change in said instruction signal does not change, and wherein said oil pressure instructor outputs an oil pressure other than an oil pressure in said non-modulating range, as the pressure instruction value.

8. A hydraulic control system according to claim 1, further comprising:

judger for judging that at least one of the rotating speed of said prime mover and its fluctuation is within predetermined ranges which are preset according to individuals, wherein said oil pressure instructor outputs said plurality of instruction signals where the rotating speed of said prime mover or its fluctuation falls within the individual predetermined ranges.

9. A hydraulic control system according to claim 1, wherein said oil pressure instructor includes means for outputting an instruction signal at a predetermined pressure instruction value in a rising procedure of output oil pressure of said pressure modulating mechanism, and an instruction signal at a predetermined pressure instruction value in a falling procedure of the output oil pressure of said pressure mechanism, and wherein said oil pressure detector detects an oil pressure according to said pressure instruction value in the rising procedure of the output oil pressure of said pressure modulating mechanism and an oil pressure according to said pressure instruction value in the falling procedure of the output oil pressure of said pressure modulating mechanism.

10. A hydraulic control system according to claim 1, wherein said pressure instruction value includes at least any two of the highest pressure value in a using range of said transmission, an average oil pressure value in an ordinary running state which is the most frequent for the vehicle having said transmission mounted thereon, and the lowest pressure value in the range of said transmission.

11. A hydraulic control system according to claim 1, further comprising:

inhibiter for inhibiting the learning and correction by said learning and correction unit, where either a deviation between said pressure instruction value and the oil pressure detected by said oil pressure detector or the learning and correction based on said pressure instruction value and the oil pressure detected by said oil pressure detector is higher than a predetermined value.

12. A hydraulic control system for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmissions, comprising a controller which executes control of:

raising a rotating speed of said prime mover while said transmission is not rotated by said prime mover, to increase an output volume of said hydraulic pump;

oil pressure instructing for outputting a plurality of instruction signals of different pressure instruction values to said pressure modulating mechanism while the output volume of said hydraulic pump is increased, to output oil pressures at a plurality of pressure levels;

detecting the oil pressure to be modulated and fed to said transmission, at said plurality of pressure levels; and learning and correcting said instruction signals on the basis of the pressure instruction value outputted by said detect oil pressure instructing control and the oil pressure detected by said oil pressure detecting control.

13. A hydraulic control system for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising steps of:

raising a rotating speed of said prime mover while said transmission is not rotated by said prime mover, to increase an output volume of said hydraulic pump;

outputting a plurality of instruction signals of different pressure instruction values to said pressure modulating mechanism while the output volume of said hydraulic pump is increased, to output oil pressures at a plurality of pressure levels;

detecting the oil pressure to be modulated and fed to said transmission, at said plurality of pressure levels; and learning and correcting said instruction signals on the basis of to outputted pressure instruction value and the detected oil pressure.

14. A hydraulic control system for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising:

oil pressure instructor for outputting an instruction signal at a predetermined pressure instruction value to said pressure modulating mechanism to output an oil pressure at a predetermined pressure level;

oil pressure detector for detecting the oil pressure to be modulated and fed to said transmission, at a plurality of pressure levels;

learning and correction unit for learning and correcting said instruction signals on the basis of the pressure instruction value outputted by said oil pressure instructor and the oil pressure detected by said oil pressure detector; and rotating speed raiser for raising the rotating speed of said prime mover when an output timing of said oil pressure instructor is detected.

15. A hydraulic control system for generating an oil pressure from a hydraulic pump by turning a prime mover, as connected to a transmission capable of selecting a non-running shift position transmitting no power and said hydraulic pump, and for outputting an oil pressure instruction signal to an electrically activated pressure modulating mechanism, to modulate the oil pressure generated in said hydraulic pump to an oil pressure according to the instruction signal and to feed the modulated oil pressure to said transmission in a vehicle comprising:

rotating speed raiser for raising the rotating speed of said prime mover, while said non-running shift position is selected and/or where the vehicle is stopped, to increase an output volume of said hydraulic pump;

oil pressure instructor for outputting a plurality of instruction signals of different pressure instruction values to said pressure modulating mechanism while the output volume of said hydraulic pump is increased, to output oil pressures at a plurality of pressure levels;

oil pressure detector for detecting the oil pressure to be modulated and fed to said transmission, at said plurality of pressure levels; and learning and correction unit for learning and correcting said instruction signals on the basis of the pressure instruction value outputted by said oil pressure instructor and the oil pressure detected by said oil pressure detector.

16. A hydraulic control system for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising:

vehicle speed detector for detecting the speed of a vehicle having said transmission mounted thereon;

oil pressure instructor for outputting an instruction signal at a predetermined pressure instruction value to said pressure modulating mechanism, when the vehicle speed detected by said vehicle speed detector is higher than a predetermined reference vehicle speed and is stable, to output oil pressures at a plurality of pressure levels;

oil pressure detector for detecting the oil pressure to be modulated and fed to said transmission; and learning and correction unit for learning and correcting said instruction signals on the basis of the pressure instruction value outputted by said oil pressure instructor and the oil pressure detected by said oil pressure detector.

17. A hydraulic control system for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising a controller which executes controls of:

outputting an instruction signal at a predetermined pressure instruction value to said pressure modulating mechanism to output an oil pressure at a predetermined pressure level;

detecting the oil pressure to be modulated and fed to said transmission, at a plurality of pressure levels;

learning and correcting said instruction signals on the basis of the pressure instruction value outputted by said oil pressure instructing control and the oil pressure detected by said oil pressure detecting control; and raising the rotating speed of said prime mover when an output timing of said oil pressure instructing control is detected.

18. A hydraulic control system for generating an oil pressure from a hydraulic pump by turning a prime mover, as connected to a transmission capable of select a non-running shift position transmitting no power and said hydraulic pump, and for outputting an oil pressure instruction signal to an electrically activated pressure modulating mechanism, to modulate the oil pressure generated in said hydraulic pump to an oil pressure according to the instruction signal and to feed the modulated oil pressure to said transmission in a vehicle comprising a controller which executes controls of:

raising the rotating speed of said prime mover, while said non-running shift position is selected and/or where the vehicle is stopped, to increase an output volume of said hydraulic pump;

outputting a plurality of instruction signals of different pressure instruction values to said pressure modulating mechanism while the output volume of said hydraulic pump is increased, to output oil pressures at a plurality of pressure levels;

detecting the oil pressure to be modulated and fed to said transmission, at said plurality of pressure levels; and learning and correcting said instruction signals on the basis of the mechanism, to modulate the oil pressure generated in said hydraulic pump to an oil pressure according to the instruction signal and to feed the modulated oil pressure to a transmission, comprising steps of:

outputting an instruction signal at a predetermined pressure instruction value to said pressure modulating mechanism to output an oil pressure at a predetermined pressure level;

detecting the oil pressure to be modulated and fed to said transmission, at a plurality of pressure levels;

learning and correcting said instruction signals on the basis of the pressure instruction value outputted at said oil pressure instructing step and the oil pressure detected at said oil pressure detecting step; and raising the rotating speed of said prime mover when an output timing of said oil pressure instructing step is detected.

19. A hydraulic control system for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising a controller which executes controls of:

detecting the speed of a vehicle having said transmission mounted thereon;

outputting an instruction signal at a predetermined pressure instruction value to said pressure modulating mechanism, when the vehicle speed detected by said vehicle speed detecting control is higher than a predetermined reference vehicle speed and is stable, to output oil pressures at a plurality of pressure levels;

detecting the oil pressure to be modulated and fed to said transmission; and learning and correcting said instruction signals on the basis of the pressure instruction value outputted by said oil pressure instructing control and the oil pressure detected by said oil pressure detecting control.

20. A hydraulic control method for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising steps of:

outputting an instruction signal at a predetermined pressure instruction value to said pressure modulating mechanism to output an oil pressure at a predetermined pressure level;

detecting the oil pressure to be modulated and fed to said transmission, at a plurality of pressure levels;

learning and correcting said instruction signals on the basis of the pressure instruction value outputted at said oil pressure instructing step and the oil pressure detected at said oil pressure detecting step; and raising the rotating speed of said prime mover when an output timing of said oil pressure instructing step is detected.

21. A hydraulic control method for generating an oil pressure from a hydraulic pump by turning a prime mover, as connected to a transmission capable of selecting a non-running shift position transmitting no power and said hydraulic pump, and for outputting an oil pressure instruction signal to an electrically activated pressure modulating mechanism, to modulate the oil pressure generated in said hydraulic pump to an oil pressure according to the instruction signal and to feed the modulated oil pressure to said transmission in a vehicle comprising steps of:

raising the rotating speed of said prime mover, while said non-running shift position is selected and/or where the vehicle is stopped, to increase an output volume of said hydraulic pump;

outputting a plurality of instruction signals of different pressure instruction values to said pressure modulating mechanism while the output volume of said hydraulic pump is increased, to output oil pressures at a plurality of pressure levels;

detecting the oil pressure to be modulated and fed to said transmission, at said plurality of pressure levels; and learning and correcting said instructing signals on the basis of the pressure instruction value outputted at said oil pressure instruction step and the oil pressure detected at said oil pressure detecting step.

22. A hydraulic control method for generating an oil pressure by turning a prime mover connected to a hydraulic pump and for outputting an oil pressure instruction signal to an electrically activated pressure modulating mechanism, to modulate the oil pressure generated in said hydraulic pump to an oil pressure according to the instruction signal and to feed the modulated oil pressure to a transmission, comprising steps of:

detecting the speed of a vehicle having said transmission mounted thereon;

outputting an instruction signal at a predetermined pressure instruction value to said pressure modulating mechanism, when the vehicle speed detected by said vehicle speed detecting step is higher than a predetermined reference vehicle speed and is stable, to output oil pressures at a plurality of pressure levels;

detecting the oil pressure to be modulated and fed to said transmission; and learning and correcting said instruction signals on the basis of the pressure instruction value outputted at said oil pressure instructing step and the oil pressure detected at said oil pressure detecting step.

* * * * *